(12) United States Patent
Duerre et al.

(10) Patent No.: US 8,591,344 B2
(45) Date of Patent: Nov. 26, 2013

(54) ARRANGEMENT WITH A MASS DAMPER FOR CANCELING OUT TORSIONAL VIBRATIONS OF A SHAFT

(75) Inventors: Markus Duerre, Neuenburg (DE); Andreas Mahling, Muellheim (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 13/356,670

(22) Filed: Jan. 24, 2012

(65) Prior Publication Data

US 2012/0192673 A1    Aug. 2, 2012

(30) Foreign Application Priority Data

Feb. 2, 2011   (DE) .......................... 10 2011 010 191

(51) Int. Cl.
*F16F 15/126* (2006.01)
*F16F 15/136* (2006.01)

(52) U.S. Cl.
USPC .......................................... 464/92; 464/180

(58) Field of Classification Search
USPC ................... 464/87, 88, 89, 90, 92, 127, 180; 188/379, 380; 74/574.4
See application file for complete search history.

(56) References Cited

U.S. PATENT DOCUMENTS

| | | | |
|---|---|---|---|
| 2,834,226 A * | 5/1958 | Archie | 74/574.4 |
| 3,126,760 A * | 3/1964 | Peirce | 74/574.4 |
| 4,380,442 A * | 4/1983 | Amsel | 464/87 X |
| 4,516,955 A * | 5/1985 | Worner et al. | 464/89 |
| 4,680,984 A * | 7/1987 | Wahling et al. | 74/574.4 |
| 5,593,144 A | 1/1997 | Hamada et al. | |
| 5,704,839 A * | 1/1998 | Michael et al. | 464/89 |
| 7,022,023 B2 * | 4/2006 | Guo et al. | 464/180 |
| 7,163,460 B2 * | 1/2007 | van Wouw | |
| 2004/0099087 A1 | 5/2004 | Breese et al. | |

FOREIGN PATENT DOCUMENTS

| | | |
|---|---|---|
| DE | 3720557 A1 | 1/1988 |
| DE | 69507984 T2 | 9/1999 |
| DE | 10355327 A1 | 6/2004 |
| DE | 102008059082 A1 | 5/2010 |
| JP | 05223140 A * | 8/1993 |

OTHER PUBLICATIONS

Community Design 001785676-0001, Office for Harmonization in the Internal Market, Registered Nov. 25, 2010, p. 1-2.

* cited by examiner

*Primary Examiner* — Gregory Binda
*Assistant Examiner* — Matthieu Setliff
(74) *Attorney, Agent, or Firm* — Leydig, Voit & Mayer, Ltd.

(57) ABSTRACT

An arrangement having a gear side and a shaft side includes a shaft. A first flange is disposed on the gear side. A second flange is disposed on the shaft side. A mass damper is attached between the first flange and the second flange and including a damper ring, a hub and an elastomer layer disposed between the damper ring and the hub.

19 Claims, 5 Drawing Sheets

ARRANGEMENT WITH A MASS DAMPER FOR CANCELING OUT TORSIONAL VIBRATIONS OF A SHAFT

CROSS REFERENCE TO RELATED APPLICATIONS

Priority is claimed to German Patent Application No. 10 2011 010 191.8, filed Feb. 2, 2011, the entire disclosure of which is incorporated by reference herein.

FIELD

The invention relates to a mass damper for canceling vibrations of a shaft.

BACKGROUND

In rear-wheel drive and four-wheel drive motor vehicles, the torque is transmitted from the gearbox to the rear-axle drive by means of so-called articulated shafts. Due to the movement of aggregates, the articulated shaft has to be able to compensate for an angular offset during operation.

When flexible rubber couplings are not used, the above-mentioned angular compensation is generally carried out by cardan joints, especially universal joints, or homokinetic joints, especially constant velocity joints.

The reduction of the number of cylinders in order to save weight as well as the use of supercharged combustion engines intensify rotational irregularities in the drive trains of motor vehicles. This gives rise to intensified low-frequency rotational irregularities.

Rotational irregularities in a combustion engine can excite a local resonance site in the drive train. This can be acoustically noticeable. Torsionally harmonized mass dampers are often used in order to remedy this. Normally, these mass dampers are either attached relatively close to a gear flange on a shaft tube or on a flange by means of a press fit.

In an ever-growing number of applications, the torsional frequency of the mass dampers is less than 50 Hz. In order to prevent larger unbalances at these low frequencies due to radial migration of the damper ring, radial support elements in the form of rolling elements or sliding bearings are normally needed in conventional arrangements. A design of a mass damper of the above-mentioned type is described in Community Design 001 785 676-0001.

A mass damper that has radial support elements, however, is susceptible to wear and dirt. Moreover, strict tolerance values have to be adhered to during the production of metal parts since the metal parts have to be harmonized with the support elements.

SUMMARY OF THE INVENTION

In an embodiment, the present invention provides an arrangement having a gear side and a shaft side including a shaft, a first flange disposed on the gear side and a second flange disposed on the shaft side. A mass damper is attached between the first flange and the second flange and includes a damper ring, a hub and an elastomer layer disposed between the damper ring and the hub.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
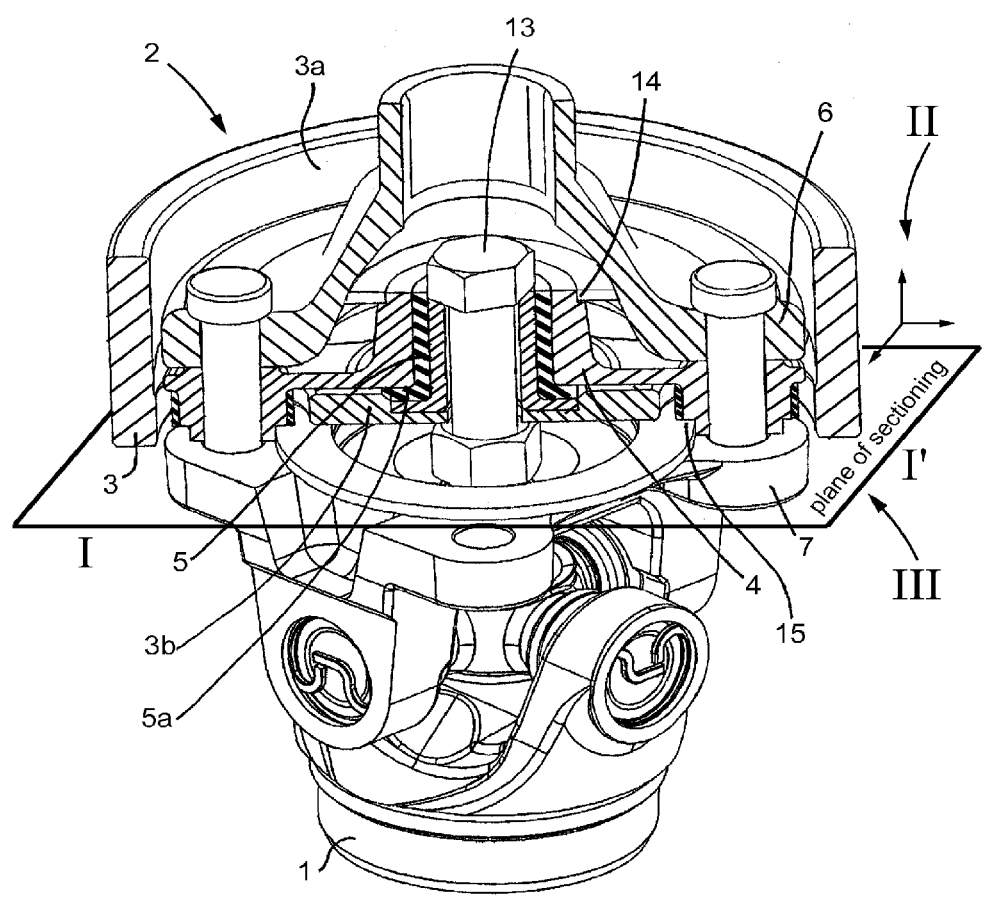
FIG. 1 a perspective, partially cutaway view of an arrangement with an articulated shaft and an articulated shaft mass damper, FIG. 2 a perspective sectional view of the articulated shaft mass damper, which has a hub and a damper ring, FIG. 3 another perspective sectional view of the articulated shaft mass damper shown in FIG. 2, FIG. 4 a perspective sectional view of the hub of the articulated shaft mass damper, and FIG. 5 another perspective sectional view of the hub of the articulated shaft mass damper shown in FIG. 4.

In an embodiment, the invention provides an arrangement for canceling out low-frequency torsional vibrations having large amplitudes in shafts, said arrangement having a simple structure while displaying great resistance to wear and dirt.

In an embodiment of the invention, the arrangement comprises a shaft and a mass damper, whereby the mass damper comprises a damper ring and a hub, whereby an elastomer layer is arranged between the damper ring and the hub, and whereby the mass damper is attached between a flange on the gear side and a flange on the shaft side. According to the invention, it was first realized that the mass damper can advantageously be screwed between the gear-side flange and a cardan joint or constant velocity joint like a sandwich. For this purpose, according to an embodiment of the invention, all that is needed is a shortening of a shaft tube and centering elements between the provided flanges and the hub. Thanks to this construction, an elastomer layer can be arranged extremely close to the center. As a result, the mass damper surprisingly exhibits sufficient radial stiffness, so that radial support elements can be dispensed with in order to avoid critical unbalances. Advantageously, an optimized residual unbalance can be achieved since the elastomer layer is close to the center. Since a centered installation space is used for the elastomer layer, and since all support elements are dispensed with, a maximum moment of inertia can be applied, even with limited radial installation space. By dispensing with radial support elements, the arrangement according to an embodiment of the invention is much more resistant to wear and dirt. The metal part tolerances can also be much greater since they do not have to be harmonized with the support elements. Thus, an arrangement for canceling out torsional vibrations in shafts is put forward, said arrangement having a simple structure while displaying great resistance to wear and dirt.

In an embodiment, the mass damper could be screwed only via the hub to the flange on the gear side as well as to the flange on the shaft side, and the damper ring can be moved relative to the hub. Therefore, the mass damper can easily be replaced in case of damage.

In an embodiment, the hub could have three or four screwed connection domes, whereby the screwed connection domes protrude in the axial direction from a base plane. Consequently, the hub can be configured to be so thick in the axial shaft direction that recesses in the hub are possible between the screw-on places. A moveable damper ring can protrude into a depression that is formed in this manner, thereby avoiding contact with the hub.

In an embodiment, the screwed connection domes could be surrounded by rubber stops. In this manner, rubber-coated torsion stops could be provided to prevent overload in case of improper use.

In an embodiment, the damper ring could have a damper rim that reaches beyond the hub in the axial and radial directions and that is connected to a spoke element that lies in a depression formed in the hub. This allows a compact structure of the mass damper since the hub is virtually inside the damper ring. The depression in the hub is advantageously used to hold inertia mass.

In an embodiment, the hub could have a radially centered receptacle that extends in the axial and radial directions, the elastomer layer being accommodated in this receptacle. As a result, the mass damper surprisingly exhibits sufficient radial stiffness, so that radial support elements can be dispensed with in order to avoid critical unbalances. Advantageously, the elastomer layer close to the center translates into an optimized residual unbalance. Since a centered installation space is used for the elastomer layer, and since all support elements are dispensed with, a maximum moment of inertia can be applied, even with limited radial installation space.

In an embodiment, the elastomer layer could protrude out of the receptacle in the axial direction and could lie against the hub with its edge folded over in the radial direction. In this manner, the damper ring can be elastically supported on the hub in the axial direction. Moreover, the torsional stiffness can be increased in order to harmonize the frequency.

In an embodiment, an inner sleeve that encloses the elastomer layer between it and the hub like a sandwich could be accommodated in the elastomer layer. The damper ring can lie axially against the inner sleeve and can be screwed to the hub via said sleeve. Before this backdrop, the hub could be screwed to the damper ring by means of a central screwed connection. It is also conceivable to connect the damper ring to the hub by means of a press fit. This makes it possible to dispense with screws.

In an embodiment, centering means could be formed in the hub and/or in the flanges. The centering means could be configured as grooves.

In an embodiment, the shaft could be configured as an articulated shaft. In rear-wheel drive and four-wheel drive motor vehicles, the torque is transmitted from the gearbox to the rear-axle drive by means of so-called articulated shafts. Due to the movement of aggregates, the articulated shaft has to be able to compensate for an angular offset during operation. Because of their structure, articulated shafts are especially susceptible to the occurrence of local resonance sites, which have to be compensated for by means of mass dampers.

There are various possibilities for configuring and refining the teaching of the present invention in an advantageous manner.

In conjunction with the explanation of a preferred embodiment with reference to the drawing, preferred embodiments and refinements of the teaching are also explained in a general context.

FIG. 1 shows an arrangement comprising a shaft 1, namely, an articulated shaft, and a mass damper 2, namely, an articulated shaft mass damper, whereby the mass damper 2 comprises a damper ring 3 and a hub 4, whereby an elastomer layer 5 is arranged between the damper ring 3 and the hub 4. The mass damper 2 is fastened between a flange 6 on the gear side and a flange 7 on the shaft side.

The mass damper 2 is screwed only via the hub 4 to the flange 6 on the gear side and to the flange 7 on the shaft side, whereby the damper ring 3 can be moved relative to the hub.

Figure 2:
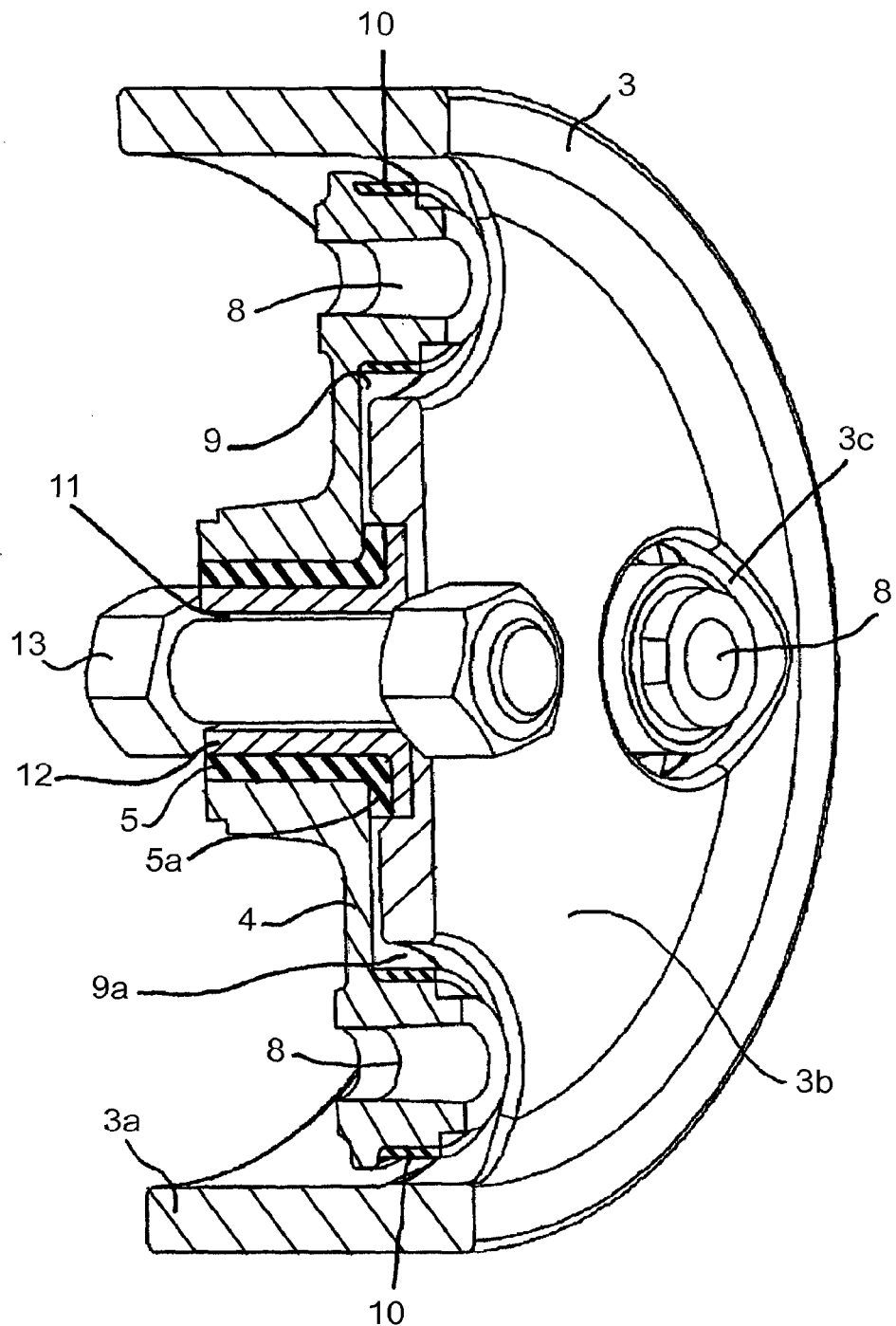
Figure 3:
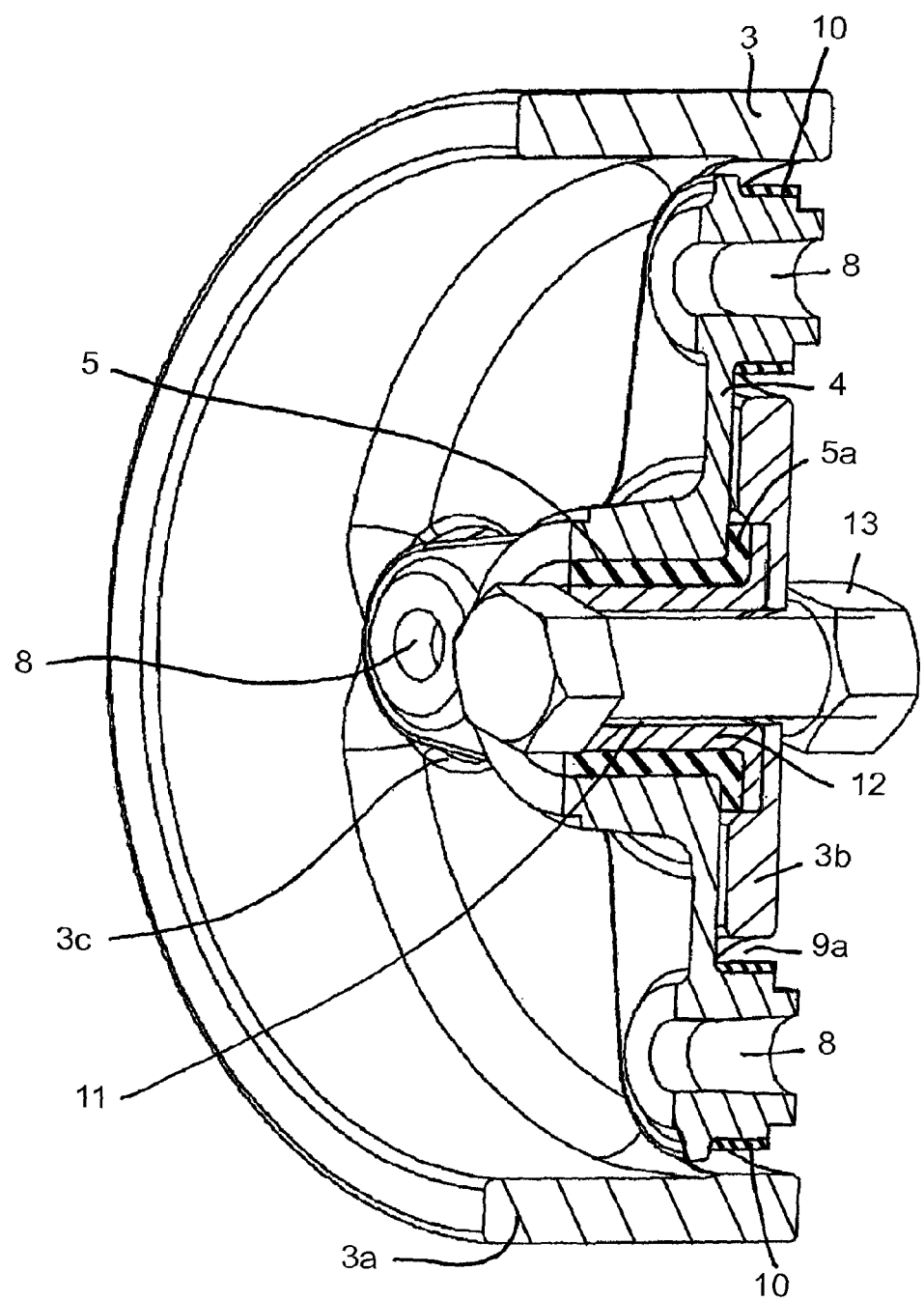

FIGS. 2 and 3 show that the hub 4 has four screwed connection domes 8, whereby the screwed connection domes 8 project away from a base plane 9 in the axial direction. However, it is also conceivable to provide just three or else more than four screwed connection domes 8.

The screwed connection domes 8 are surrounded by rubber stops 10 around their circumferences. The rubber stops 10 are configured as sleeve-like elements and are laid over the outer circumferential surfaces of the screwed connection domes 8.

FIGS. 2 and 3 show that the damper ring 3 has a damper rim 3a that reaches beyond the hub in the axial and radial directions, said damper rim 3a being connected to a spoke element 3b, and said spoke element 3b lies in a depression 9a formed in the hub 4. The depression 9a is partially delimited by the screwed connection domes 8 and the base plane 9. In this manner, a kind of trough is formed in which the spoke element 3b lies. In the spoke element 3b, there are recesses 3c through which the screwed connection domes 8 can pass. The spoke element 3b is essentially configured as a disk with recesses.

Figure 4:
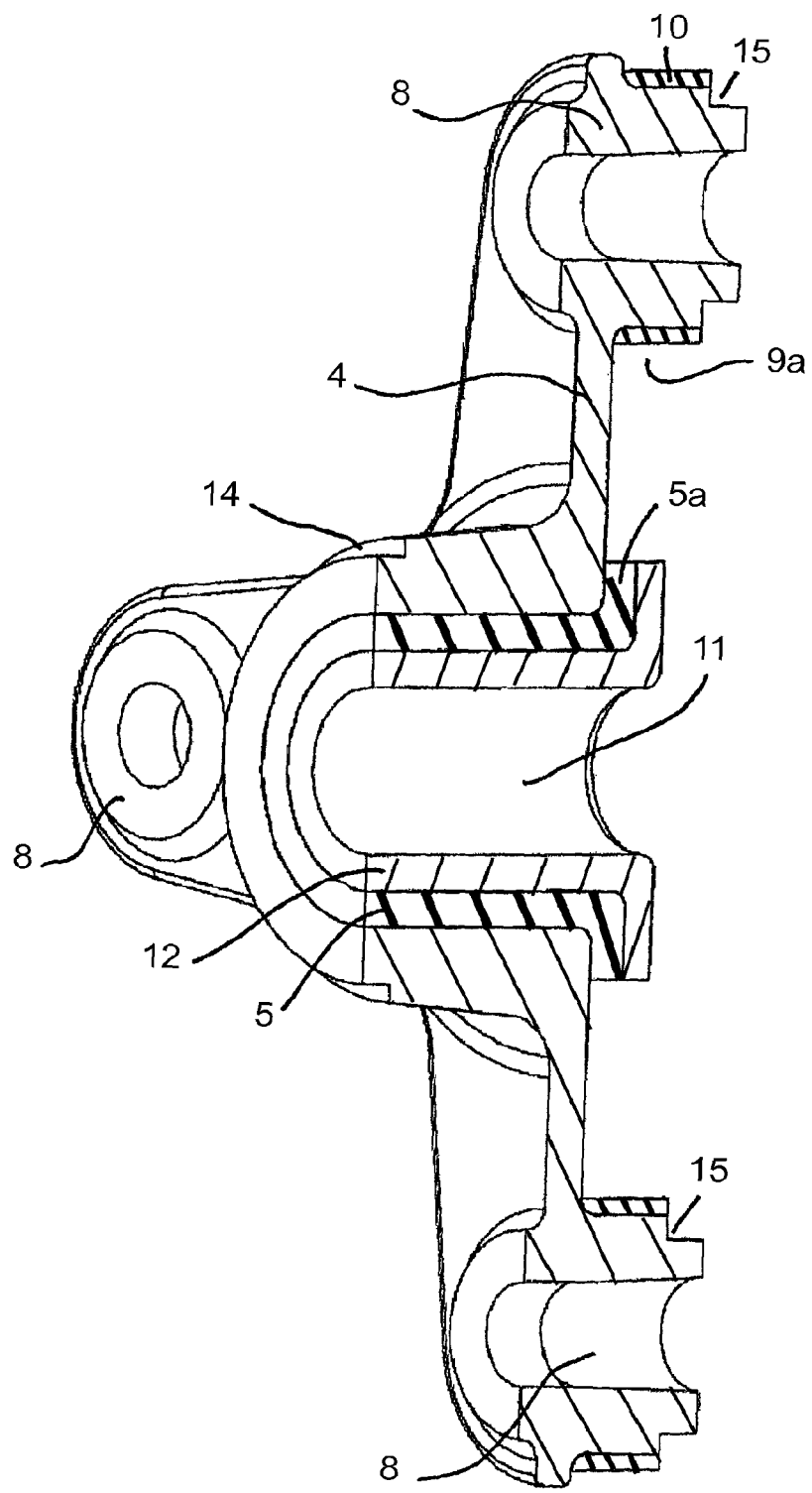
Figure 5:
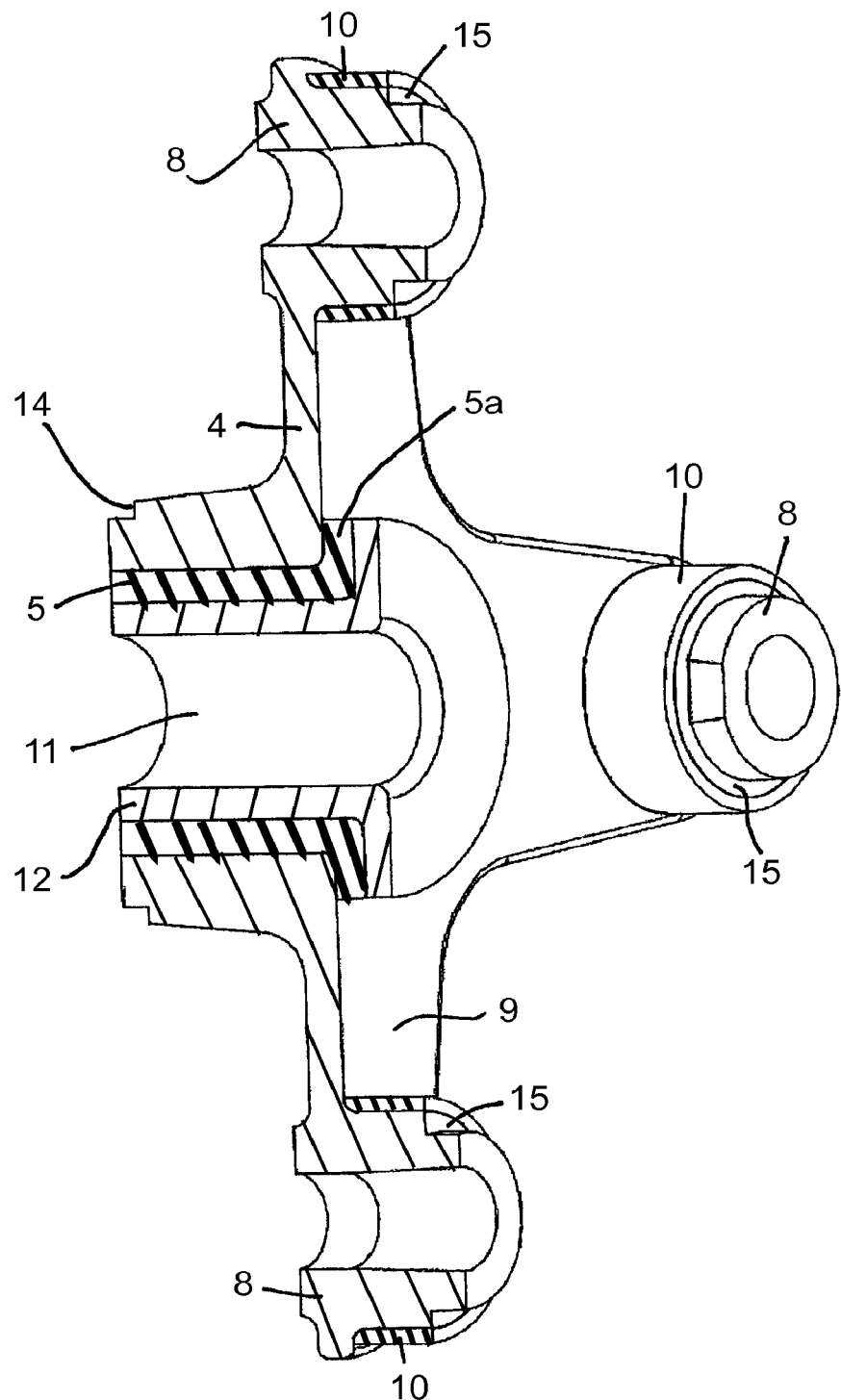

FIGS. 4 and 5 show that the hub 4 has a radially centered receptacle 11 that extends in the axial direction, said elastomer layer 5 being accommodated in the receptacle 11. The elastomer layer 5 protrudes out of the receptacle 11 in the axial direction and lies against the hub 4 with its edge 5a folded over in the radial direction. As a result, the elastomer layer 5 has a pot-shaped configuration.

In the elastomer layer 5, an inner sleeve 12 is accommodated that encloses the elastomer layer 5 between it and the hub 4 like a sandwich. The inner sleeve 12 likewise has a pot-shaped configuration.

The inner sleeve 12 is screwed to the damper ring 5 through a central screwed connection 13. This is shown in FIGS. 3 and 4. The central screwed connection 13 is flush with the longitudinal axis of the shaft 1 as well as with the longitudinal axis of the huh 4. The central screwed connection 13 engages with the spoke element 3b.

FIGS. 4 and 5 show that centering means 14, 15 are formed in the hub 4. A first centering means 14 is configured as a step that faces the flange 6 on the gear side and that engages with it with a precise fit. A second centering means 15 comprises steps that face the flange 7 on the shaft side, and engages with it with a precise fit. This is shown in FIG. 1. The steps of the second centering means 15 are formed in the screwed connection domes 8. The step of the first centering means 14 is formed around the centered receptacle 11.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. An arrangement having a gear side and a shaft side, the arrangement comprising:
    a shaft;
    a first flange disposed on the gear side;
    a second flange disposed on the shaft side; and
    a mass damper attached between the first flange and the second flange,
    wherein the mass damper includes (i) a damper ring, (ii) a hub, (iii) an elastomer layer disposed between the damper ring and the hub, and (iv) at least three screwed connection domes protruding in an axial direction from a base plane of the hub, wherein the at least three screwed connection domes are each surrounded by a rubber stop, wherein each rubber stop is in direct contact, respectively, to the screwed connection dome, wherein the damper ring includes a damper rim extending past the hub in the axial direction and in a radial direction and connected to a spoke element disposed in a depression of the hub, and wherein the mass damper is screwed, via the hub only, to the first flange and the second flange, so that the damper ring is movable relative to the hub.

2. The arrangement as recited in claim 1, wherein the hub includes a central radially centered receptacle extending in an axial direction, the elastomer layer being disposed in the radially centered receptacle.

3. The arrangement as recited in claim 2, wherein the elastomer layer protrudes out of the receptacle in the axial direction and is disposed against the hub such that an edge of the elastomer layer is folded over the hub in a radial direction.

4. The arrangement as recited in claim 2, further comprising an inner sleeve disposed radially inside of and against the elastomer layer so as to enclose the elastomer layer in a sandwich-like manner between the huh and the inner sleeve.

5. The arrangement as recited in claim 4, wherein the inner sleeve is screwed to the damper ring via a central screwed connection.

6. The arrangement as recited in claim 4, wherein the inner sleeve is fastened to the damper ring via a press fit.

7. The arrangement as recited in claim 4, wherein the inner sleeve extends axially along the receptacle, protrudes out of the receptacle in the axial direction, and is disposed against the elastomer layer such that an edge of the inner sleeve is folded over the elastomer layer in a radial direction.

8. The arrangement as recited in claim 4, wherein the inner sleeve has a pot-shaped configuration.

9. The arrangement as recited in claim 8, wherein the elastomer layer has a pot-shaped configuration.

10. The arrangement as recited in claim 1, further comprising:

a centering piece formed in at least one of the huh, the first flange, and the second flange.

11. The arrangement as recited in claim 1, wherein the shaft includes an articulated shaft.

12. The arrangement as recited in claim 1, having 3 screwed domes.

13. The arrangement as recited in claim 1, having 4 screwed domes.

14. The arrangement as recited in claim 1, wherein the elastomer layer has a pot-shaped configuration.

15. The arrangement as recited in claim 1, further comprising:

a first centering piece; and a second centering piece, wherein the first and the second centering pieces are formed in at least one of the hub, the first flange, and the second flange, and wherein the first and the second centering pieces are not both formed on the hub, the first flange, or the second flange.

16. An arrangement having a gear side and a shaft side, the arrangement comprising:

a shaft;

a first flange disposed on the gear side;

a second flange disposed on the shaft side; and a mass damper attached between the first flange and the second flange, the mass damper including (i) a damper ring, (ii) a hub, (iii) an elastomer layer disposed between the damper ring and the hub, and (iv) at least three screwed connection domes protruding in an axial direction from a base plane of the hub; and an inner sleeve disposed radially inside of and against the elastomer layer so as to enclose the elastomer layer in a sandwich-like manner between the hub and the inner sleeve, wherein the inner sleeve extends axially along the receptacle, protrudes out of the receptacle in the axial direction, and is disposed against the elastomer layer such that an edge of the inner sleeve is folded over the elastomer layer in a radial direction, wherein the hub includes a central radially centered receptacle extending in an axial direction, the elastomer layer being disposed in the radially centered receptacle, and wherein the mass damper is screwed, via the huh only, to the first flange and the second flange, so that the damper ring is movable relative to the hub.

17. The arrangement as recited in claim 16, wherein the inner sleeve is screwed to the damper ring via a central screwed connection.

18. The arrangement as recited in claim 16, wherein the inner sleeve is fastened to the damper ring via a press fit.

19. The arrangement as recited in claim 16, further comprising:

a centering piece formed in at least one of the hub, the first flange, and the second flange.

* * * * *

UNITED STATES PATENT AND TRADEMARK OFFICE
CERTIFICATE OF CORRECTION

PATENT NO. : 8,591,344 B2
APPLICATION NO. : 13/356670
DATED : November 26, 2013
INVENTOR(S) : Markus Duerre and Andreas Mahling It is certified that error appears in the above-identified patent and that said Letters Patent is hereby corrected as shown below:

In the Claims

In Col. 5 Line 23, claim 4, Col. 5 Line 40, claim 10 and Col. 6 Line 36, claim 16 the word "hub" has been mistyped.

It reads: "huh"

It should read: "hub"

Signed and Sealed this
Twenty-fifth Day of March, 2014

Michelle K. Lee
*Deputy Director of the United States Patent and Trademark Office*